(12) United States Patent
Truchard et al.

(10) Patent No.: US 6,983,393 B2
(45) Date of Patent: Jan. 3, 2006

(54) DETERMINISTICALLY HANDLING ASYNCHRONOUS EVENTS IN A TIME TRIGGERED SYSTEM

(75) Inventors: James J. Truchard, Austin, TX (US); Brian Keith Odom, Georgetown, TX (US)

(73) Assignee: National Instruments Corporation, Austin, TX (US)

( * ) Notice: Subject to any disclaimer, the term of this patent is extended or adjusted under 35 U.S.C. 154(b) by 413 days.

(21) Appl. No.: 10/316,365

(22) Filed: Dec. 11, 2002

(65) Prior Publication Data

US 2004/0117685 A1 Jun. 17, 2004

(51) Int. Cl.
*G06F 1/04* (2006.01)
*G06F 13/42* (2006.01)
*G06F 19/00* (2006.01)
*G06F 15/00* (2006.01)
*G01D 3/00* (2006.01)

(52) U.S. Cl. .................. 713/500; 713/400; 702/57; 702/108; 702/127

(58) Field of Classification Search ............... 713/500, 713/400
See application file for complete search history.

(56) References Cited

U.S. PATENT DOCUMENTS

| 5,313,622 | A | | 5/1994 | Truchard et al. |
| 5,717,614 | A | * | 2/1998 | Shah et al. ................ 702/119 |
| 5,974,541 | A | | 10/1999 | Hall et al. |
| 6,055,559 | A | * | 4/2000 | Shimizu et al. ............ 718/107 |
| 6,359,946 | B1 | | 3/2002 | Ryan |
| 6,366,686 | B1 | | 4/2002 | Schroeder et al. |
| 6,741,558 | B1 | * | 5/2004 | Gresham .................... 370/230 |

* cited by examiner

*Primary Examiner*—Lynne H. Browne
*Assistant Examiner*—Stefan Stoynov
(74) *Attorney, Agent, or Firm*—Meyertons Hood Kivlin Kowert & Goetzel, P.C.; Jeffrey C. Hood (57) ABSTRACT

A method for operating a system that includes several subsystems may involve establishing one or more synchronized timelines for the system; allocating timeslots within each of the timelines for operation of one or more devices in the system; detecting an input event asynchronously to the timeline; generating a timestamp indicative of the time at which the input event is detected relative to the timeline; performing a processing task in response to the input event during a time slot allocated to the processing task; and inhibiting generation of an output event until a second time relative to the timelines. Performing the processing task may generate data representative of the output event as well as data representative of the second time. The second time may be a pre-determined time interval after the input event detection time.

11 Claims, 10 Drawing Sheets

DETERMINISTICALLY HANDLING ASYNCHRONOUS EVENTS IN A TIME TRIGGERED SYSTEM

BACKGROUND OF THE INVENTION

1. Field of the Invention

This invention relates to instrumentation and computing systems and, more particularly, to synchronizing devices in an instrumentation and/or computing system.

2. Description of the Related Art

Control over the activities of real-time computing systems is often dictated by one of two different principles: time-triggered control and event-triggered control. In a time-triggered system, all activities are carried out at certain predesignated points in time. To achieve this, nodes in time-triggered systems have a common notion of time, typically through the use of synchronized clocks. In contrast, nodes in an event-triggered system carry out activities in response to relevant events, which do not happen at predesignated times.

One type of system that may be controlled according to a time-triggered or event-triggered control system is an instrumentation system. An instrument is a device that collects data or information from an environment or unit under test (UUT) and displays this information to a user. An instrument may also analyze and process acquired data prior to displaying the data to the user. Some instruments may be used to provide test stimuli to a UUT. Examples of instruments include oscilloscopes, digital multimeters, pressure sensors, arbitrary waveform generators, digital waveform generators, etc. The information that may be collected by respective instruments includes information describing voltage, resistance, distance, velocity, pressure, frequency of oscillation, humidity, or temperature, among others.

Computer-based instrumentation systems typically include transducers for transducing a physical phenomenon into an electrical signal, signal conditioning logic to perform amplification, isolation, and/or filtering, and analog-to-digital (A/D) conversion logic for receiving analog signals and providing corresponding digital signals to the host computer system.

In a computer-based system, the instrumentation hardware or device is typically an expansion board plugged into one of the I/O slots of the computer system. In another common instrumentation system configuration, the instrumentation hardware is coupled to the computer system via other means such as through a VXI (VME extensions for Instrumentation) bus, a PXI (PCI eXtensions for Instrumentation) bus, a GPIB (General Purpose Interface Bus), a serial port or bus, or parallel port of the computer system. The instrumentation hardware may include a DAQ board, a computer-based instrument such as a multimeter, or another type of instrumentation device.

Modern instrumentation systems may also include networked measurement systems. In a networked measurement system, two or more instrumentation or measurement devices may be coupled over a network and may operate together to perform a instrumentation or measurement function.

Some computer-based and/or network-based instrumentation systems include several instrumentation and/or DAQ devices. Each device may generate and/or capture data. Other resources within the system may process captured data. In order to synchronize devices within an instrumentation system, it may be desirable to use a time-triggered control system to synchronize the instrumentation system devices to a common time. However, it may also be desirable to have devices respond to external events within a certain amount of time. The external events may occur asynchronously to the common time. Existing solutions often use interrupt-based techniques to handle such asynchronous events by preempting or interrupting already-scheduled processes. However, interrupt-based handling may disrupt the operation of one or more system devices. Accordingly, it is desirable to have an instrumentation system controlled by a time-triggered control system that is able to handle asynchronous events in a non-disruptive manner. Similar performance may be desirable in other distributed systems such as control and monitoring systems.

SUMMARY

Various embodiments of a method and system for handling asynchronous events in a time-triggered system may be implemented. In one embodiment, a method for operating a system that includes several subsystems may involve establishing one or more synchronized timelines for the system; allocating timeslots within each of the timelines for operation of one or more devices in the system; detecting an input event asynchronously to the timeline; generating a timestamp indicative of the time at which the input event is detected relative to the timeline; performing a processing task in response to the input event during a time slot allocated to the processing task; and inhibiting generation of an output event until a second time relative to the timelines. Performing the processing task may generate data representative of the output event as well as data representative of the second time when the output event should be generated. The second time may be a pre-determined time interval after the input event detection time.

In some embodiments, a system may include several devices. One or more timelines may be established for the system, and each of the timelines may be synchronized to each other. Each of the timelines may include timeslots allocated to control operation of one or more devices. One or more devices included in the system may also be configured to detect an input event that occurs asynchronously to the timeline and to generate a timestamp indicative of an event arrival time of the input event relative to the timelines. A functional unit coupled to the device that detects the input event may be configured to perform a processing task in response to detection of the input event. The functional unit may be configured to perform the processing task during one or more timeslots allocated to the processing task within the timelines. The processing task may generate data indicative of an output event. The device that includes the functional unit may operate to generate the output event at a second time relative to the one or more timelines. For example, a delay unit coupled to the functional unit may be configured to inhibit the output event until a second time relative to the one or more timelines. The second time may be dependent on the timestamp indicative of the input arrival time of the input event.

In other embodiments, a system may include several subsystems configured to be synchronized to a system clock. An input path included in one of the subsystems may be configured to detect an input event and to generate a timestamp indicating a time at which the input event is detected relative to a system clock value. The input event may be detected asynchronously to the system clock. A functional unit included in one of the subsystems may be configured to perform a process in response to detection of the input event. The functional unit may inhibit performance of the process until a first timeslot allocated to performance of the process by the functional unit. An output path coupled to the functional unit may be configured to inhibit a resulting output event generated by performing the process until a second time, where the second time is dependent on the timestamp.

BRIEF DESCRIPTION OF THE DRAWINGS

A better understanding of the present invention can be obtained when the following detailed description is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 1:
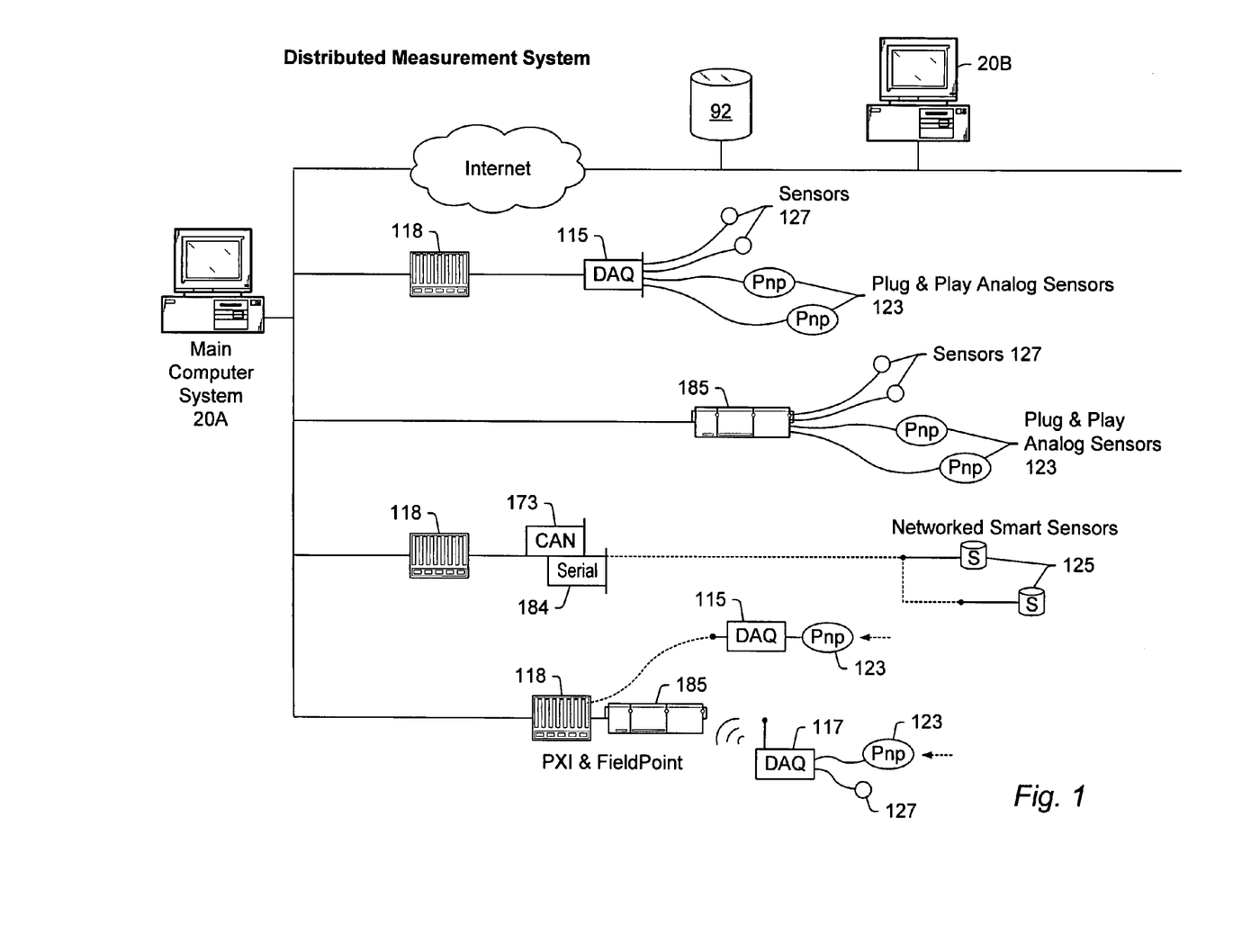
FIG. 1 illustrates one embodiment of a distributed measurement system.

FIG. 1—Distributed Measurement System

FIG. 1 shows an exemplary distributed measurement system. As shown, an exemplary measurement system may include a computer system 20A having a display. The computer system 20A may couple through one or more networks or buses to various measurement devices.

In this exemplary embodiment, the computer 20A may couple through the Internet (or another network) to a second computer 20B and to a storage system storing a database 92. The computer 20A may couple to a PCI or PXI (PCI/PXI) chassis 118 that includes one or more DAQ (data acquisition) cards, which in turn couple to one or more Plug & Play analog sensors 123 or other sensors 127. The computer 20A may couple to a distributed I/O system (or distributed data acquisition system) 185, such as the Fieldpoint system available from National Instruments, which in turn couples to one or more Plug & Play analog sensors 123 or other sensors 127. The computer 20A may couple to a PCI/PXI chassis 118 that includes one or more industrial network cards, such as a CAN interface card 173 and a serial interface card 184, which in turn may couple to one or more networked smart sensors 125. The computer 20A may couple to a PXI system 118 and/or distributed I/O system 185, which in turn couples to one or more DAQ modules 115 connected in a wired manner, such as through a serial, parallel, or network bus. The DAQ modules 115 may couple to one or more Plug & Play analog sensors 123, smart sensors 125, or other sensors 127. The PXI system 118 and/or distributed I/O system 185 may also couple to one or more wireless DAQ modules 117 connected in a wireless manner. The wireless DAQ module 117 may couple to one or more Plug & Play analog sensors 123 and/or other sensors 127.

The main computer system 20A may be part of the system that executes programs during operation of the system. The computer system 20A may serve as the central console (or main computer system) of the distributed measurement system. The computer system 20A may also be used to create, configure and/or deploy programs to any of the various devices in the distributed measurement system in some embodiments. In some of the latter embodiments, after deployment, the various programs may execute without further involvement of the main computer system 20A.

In a distributed measurement system such as the one shown in FIG. 1, various distributed devices may be synchronized to a common clock, and operation of those devices may be controlled by a time-triggered control system. Such a system may also be described as having devices that are synchronized to a common timeline.

Various distributed devices such as DAQ modules 115 and 117, computer system 20A, cards within PCI/PXI chassis 118, distributed I/O devices 185, and interface cards 173 and 184 may each maintain a local clock. The local clock may be a physical clock (e.g., generated by a crystal oscillator) or a logical clock (e.g., a counter maintained in a register or memory device) derived from a physical clock. Each device's local clock may be used to control when that device performs data processing, data acquisition, stimuli generation, and other tasks. Each local clock may be synchronized to the common timeline.

In some embodiments, the frequency of the common timeline may be determined by the sampling rate of the system or by a division of the system sampling rate (e.g., in data acquisition-focused implementations). In some control embodiments, the frequency of the common timeline may be based on the processing resources (e.g., in control-focused implementations).

In one embodiment, devices may be synchronized to a common timeline by use of timestamped synchronization messages. One device (e.g., computer system 20A) may be designated as a master device. Periodically, the master device may generate a synchronization message and send the synchronization message to the other distributed devices. The master device may also send a corresponding timestamp indicating when the synchronization message is generated and/or sent according to the master device's clock. Each distributed device may receive the synchronization message and responsively generate a local timestamp to indicate the local time at which the synchronization message is received. Each distributed device may use the local timestamp value and the master timestamp value to synchronize the local clock to the master device's clock. Note that various other techniques may be used to synchronize the clocks of the distributed devices. For example, the synchronization technique may be one of those described in U.S. Pat. No. 6,370,159, titled "System Application Techniques Using Time Synchronization," issued Apr. 9, 2002; U.S. Pat. No. 5,566,180, titled "Method for Recognizing Events and Synchronizing Clocks," issued Oct. 15, 1996; and U.S. Pat. No.

6,278,710, titled "Enhancements to Time Synchronization in Distributed Systems," issued Aug. 21, 2001, which are hereby incorporated by reference in their entirety as though fully and completely set forth herein.

The common timeline may be subdivided into several time periods. The periods may have equal lengths in some embodiments. One or more timeslots may be defined within each period. For example, if each time period is 10 ms in duration, each time period may include ten 1 ms timeslots. Devices and processes in the distributed instrumentation system may be given access to shared resources through time slot allocation. One or more timeslots within a particular period may be allocated to each process and/or device that needs to access a shared resource within that period. Timeslots allocated to processes may control the times at which each process executes as well as the duration of each process's execution. Timeslots allocated to devices may control when each device accesses a shared resource. For example, if the shared resource is a communication device, the timeslot allocation may control when each device sends and/or receives messages on a bus or interconnect. Note that if a resource is not shared (e.g., a separate processing resource is available for each process that needs to be executed) within a particular period, timeslots controlling access to that resource within that period may not be allocated. Alternatively, all (or most) of the available timeslots in that period may be allocated to a single process or device. Note that timeslot allocations may be different in each period.

In one embodiment, timeslots may be allocated manually before operation of the system. In other embodiments, timeslots may be allocated by a compiler (e.g., a compiler running on computer system 20A). Data indicative of the compiler-generated timeslot allocations may be transmitted to devices controlled by those timeslot allocations via the communication links shown in FIG. 1. An example of a compiler that may be used in one embodiment is the Giotto compiler described by T. A. Henzinger, B. Horowitz, and C. M. Kirsch in *Giotto: A time-triggered language for embedded programming*, Proceedings of the First International Workshop on Embedded Software, Lecture Notes in Computer Science Vol. 2211, pp 175–194, Springer-Verlag 2001. Other timeslot allocation mechanisms may also be used. Systems other than the system shown in FIG. 1 may be similarly controlled through a common timeline and timeslot allocation.

Figure 2:
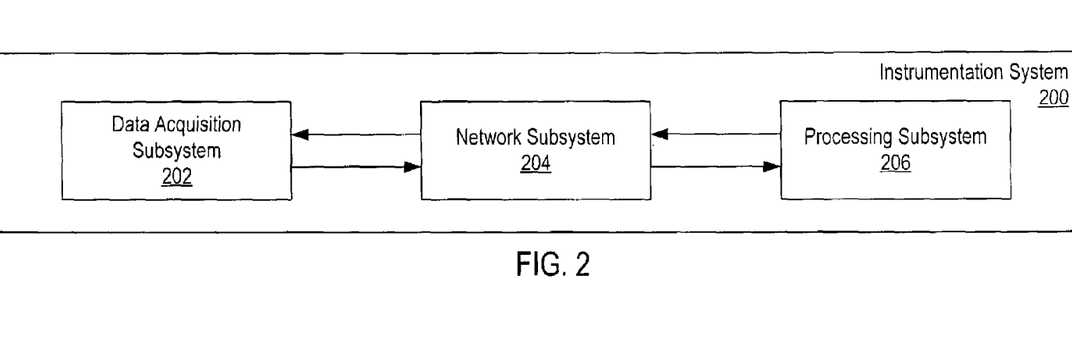
FIG. 2 is a block diagram of one embodiment of an instrumentation system.

FIG. 2 shows a block diagram of one embodiment of an exemplary instrumentation system 200. The instrumentation system may, in some embodiments, be implemented as a distributed measurement system as described above. In the illustrated embodiment, the instrumentation system 200 includes three subsystems, each of which may include one or more distributed devices like those shown in FIG. 1. The data acquisition subsystem 202 may perform data acquisition tasks and may, for example, include one or more PXI or PCI instrumentation cards. The processing subsystem 206 includes functional units or processing resources (e.g., one or more processors, CPUs, microcontrollers, programmable hardware resources such as PLDs (Programmable Logic Devices), PLAs (Programmable Logic Arrays), and FPGAs (Field Programmable Gate Arrays), or other devices capable of executing software instructions and/or hardware configuration programs) configured to execute various software processes. Some of these processes may operate on data acquired by the data acquisition subsystem 202. The network subsystem 204 may facilitate communication of data and commands between the data acquisition subsystem 202 and the processing subsystem 206. Devices within each subsystem 202–206 are synchronized to a common timeline.

Figure 3:
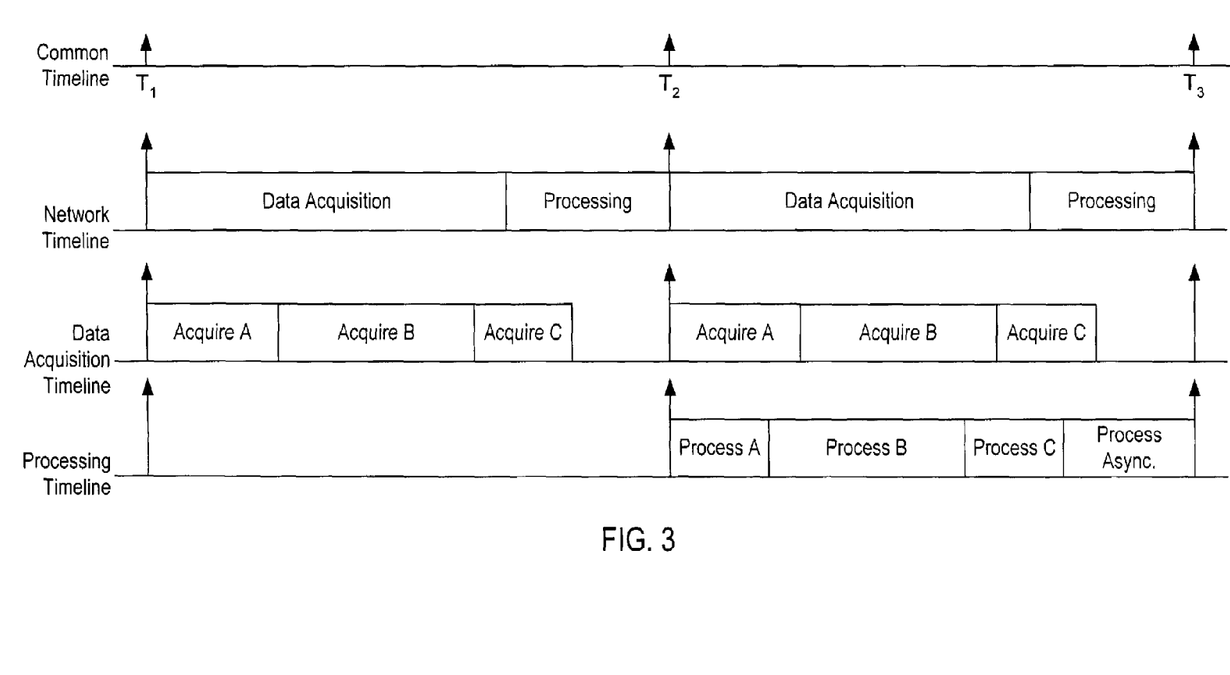
FIG. 3 illustrates a common timeline and timeslot allocations that may be used in one embodiment.

FIG. 3 shows a common timeline to which devices in subsystems 202–206 may be synchronized. Two periods of the common timeline are shown. The first period begins at T1 and continues until T2. The second time period begins at T2 and continues until T3. Each time period includes a discrete number of timeslots. Each time period may also include the same number of timeslots. T1, T2, and T3 may represent ticks of a system clock.

A device whose operation is controlled by particular timeslot allocation may determine when a particular timeslot begins based on the current value of that device's local clock. For example, in one embodiment, the timeslot allocation may indicate a clock value identifying the beginning of a timeslot in which the device may access a particular resource. The device may store that clock value in a register and compare the value stored in the register to a current local clock value. When the two values are equal, the device may access the resource. Other embodiments may operate in other ways.

Certain input events detected by instrumentation system 200 may occur asynchronously to the common timeline. Typically, these input events occur externally to the system. For example, if instrumentation system 200 is implemented as a control and monitoring system, an input event may occur when a device that is being controlled and/or monitored experiences certain conditions (e.g., when an operating parameter exceeds a predetermined threshold). Similarly, an input event may occur when a unit or process under test being monitored by an instrumentation system produces a certain output or experiences a particular condition. The times at which various input events may occur may be neither predictable nor synchronous to the timeline. Such events may be described as occurring independently of the frequency of the system clock (i.e., common timeline) to which the devices within the system are synchronized.

Various devices within a system may operate to generate one or more output events in response to an asynchronous input event. The output event(s) may be guaranteed to occur at a fixed time from the input event, even if the output event time is asynchronous to the common timeline.

Instead of handling asynchronous events immediately after their detection by preempting the established timeslot allocation, asynchronous events may be handled during timeslots specifically allocated to the handling of asynchronous events. In order to facilitate this type of event handling, one or more timeslots controlling access to certain resources may be allocated to one or more processes and/or devices that may be involved in handling asynchronous events. Note that if an asynchronous event is detected, the asynchronous event may not be handled until the timeslots allocated to processes/devices that handle the event occur within the common timeline. If no asynchronous events are detected before the timeslots allocated to that process occur, the corresponding resources may be idle during those timeslots and/or these timeslots may be reassigned to other device(s) or process(es). Note also that different timeslot allocations may be used to handle different types of asynchronous events that may be detected by a given system.

Some embodiments may operate to take advantage of greatly improved processor speeds. Due to greatly increased processor speeds, timeline frequency may be much higher than was previously possible. As a result, processing of an asynchronous event during a designated timeslot may occur relatively quickly after the asynchronous event is detected (e.g., such processing may occur sooner than it would in an interrupt-based system implemented using processors having lower processor speeds).

In one embodiment, the timeslots (or timeslot) allocated to handling asynchronous events may be allocated without the allocation mechanism knowing whether those timeslots will actually be used. In other embodiments, timeslot allocation may be performed in response to an asynchronous event being detected (e.g., the allocation mechanism may allocate timeslots in which to handle the asynchronous event in the next period following detection of an asynchronous input event), and thus the allocation mechanism may know that the allocated timeslots will be used at the time of allocation. Regardless of whether the timeslot allocation is speculative or not, the number of timeslots allocated may be based on the allocation mechanism's knowledge of the handling processes' and/or devices' needs (e.g., the duration and frequency of execution and the availability of data on which to operate).

FIG. 3 also shows exemplary timeslot allocations to control access to shared resources within each subsystem 202–206. Timeslots allocating use of shared resources within the network subsystem 204 are allocated to the processing and data acquisition subsystems in the network timeline. In this embodiment, each subsystem may initiate communications via the network subsystem 204 during the timeslots allocated to that subsystem. During the other timeslots not allocated to a particular subsystem, that subsystem may be a recipient of communications sent via the network subsystem 204. In this example, a first number of timeslots are allocated to data acquisition and a second number of timeslots are allocated to processing.

The data acquisition timeline illustrates exemplary allocation of timeslots for use of shared resources within the data acquisition subsystem 202. The shared resources may be functional units, buses, interfaces, or other processing or transmission medium resources that are shared between two or more devices included in the data acquisition subsystem. In this example, timeslots within each period are allocated to three data acquisition processes A–C. Each data acquisition process may be allocated a different number of timeslots within each period. Some timeslots may not be allocated or may be reserved for handling asynchronous events that may be detected.

The processing timeline illustrates the allocation of timeslots for use of shared resources within the processing subsystem 206. Timeslots within the second period are allocated to three processes, A–C, and to a fourth process, Async, that handles asynchronous events. Processes A–C may operate on data acquired by the data acquisition subsystem 202. In some embodiments, processes A–C may be scheduled to operate on data acquired in a previous time period in order to guarantee that the data will be available to be operated on during the timeslots allocated to each process. Allocation of processing resources may also take into account allocation of communication resources (e.g., as shown in the network timeline) if data needs to be transferred from another subsystem via the network subsystem to the processing subsystem in order to ensure that data is available for processing during the timeslots allocated to that process.

Note that timeslots in the Network and Data Acquisition timelines may also (or alternatively) be allocated to devices and/or processes involved in handling asynchronous events.

Figure 4:
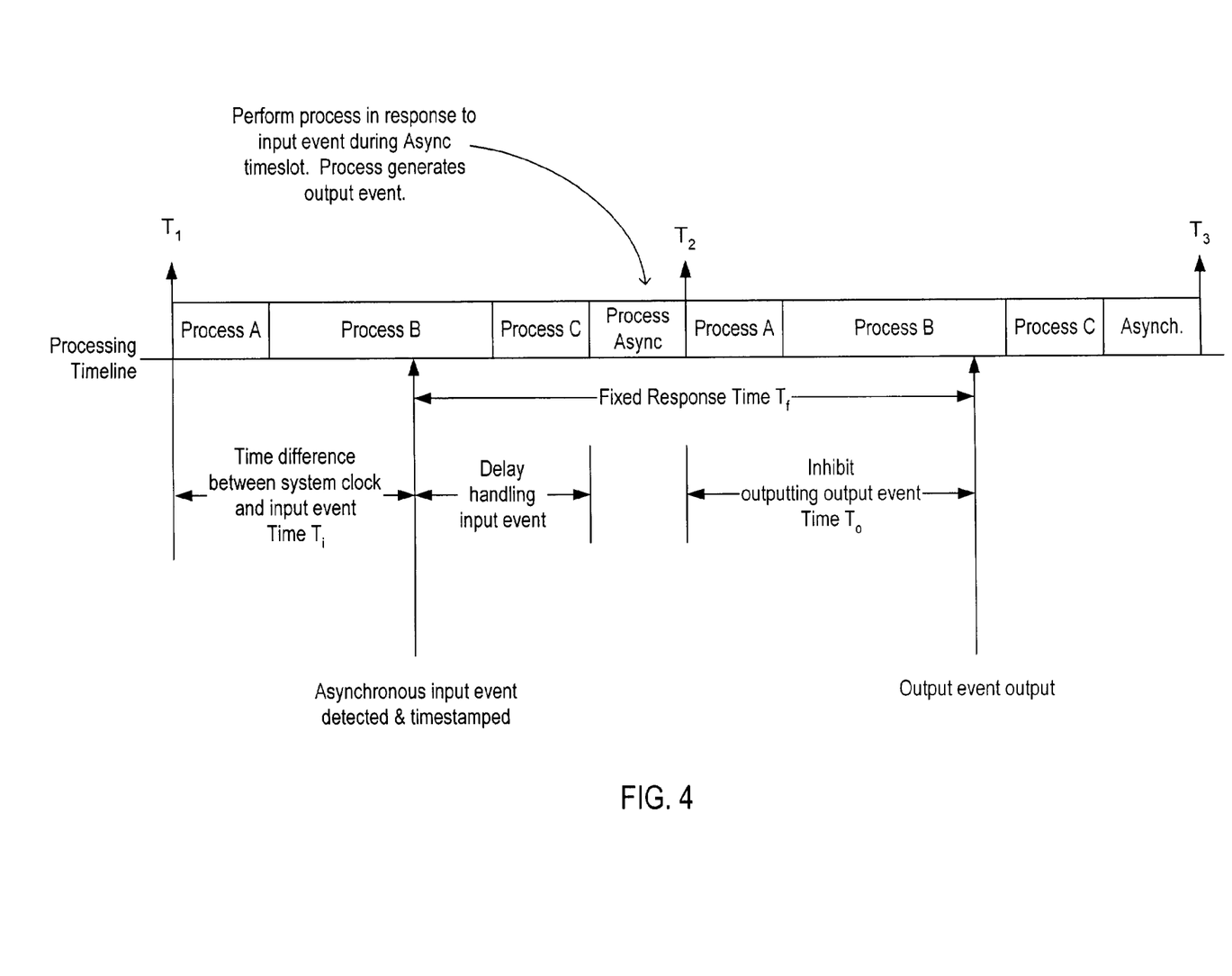
FIG. 4 illustrates how an asynchronous event may be handled relative to a common timeline in one embodiment.

FIG. 4 shows an example of how an asynchronous event may be handled within the processing timeline based on the timeslot allocation shown in FIG. 3. During a first time period extending from system clock ticks t1 to t2, four groups of one or more timeslots are allocated to Process A, Process B, Process C, and Process Async. The timeslot(s) allocated to Process Async are timeslots in which one or more processes used to handle asynchronous events may be performed. An asynchronous input event is detected and timestamped during the first time period (e.g., by a DAQ device). The timestamp indicates the time T1 at which the asynchronous event is detected relative to the system clock time T1. The system may be designed to respond to the asynchronous input event with an asynchronous output event that occurs a fixed time Tf after Ti.

Process Async is performed in response to the detection of the asynchronous event at Ti. However, performance of Process Async may not be allowed to interrupt or preempt other already-scheduled processes. Instead, performance of Process Async may be inhibited until the timeslot(s) allocated to that process. During the timeslots allocated to Process Async, the asynchronous event is handled and data indicative of one or more responsive output events may be generated. Data indicative of one or more output event times relative to the system clock may also be generated.

The data indicative of the output event(s) may be used to generate the output event (e.g., by specifying values of electrical signals to be provided to an actuator). The data indicative of the output event time may be used to inhibit performance of the output event until the output event time. Stated another way, based on data indicative of one or more output event times, a functional unit may determine an appropriate output event time, and a device may generate the output event at this determined output event time. The data indicative of the output event time may indicate a time difference To between the system clock time T2 and the output event time. Accordingly, the data indicative of the output event time may allow the output event to be performed at a fixed response time Tf after the input event is detected. Note that in some embodiments, if more than one output event is generated, each output event may have a different output event time.

Figure 5:
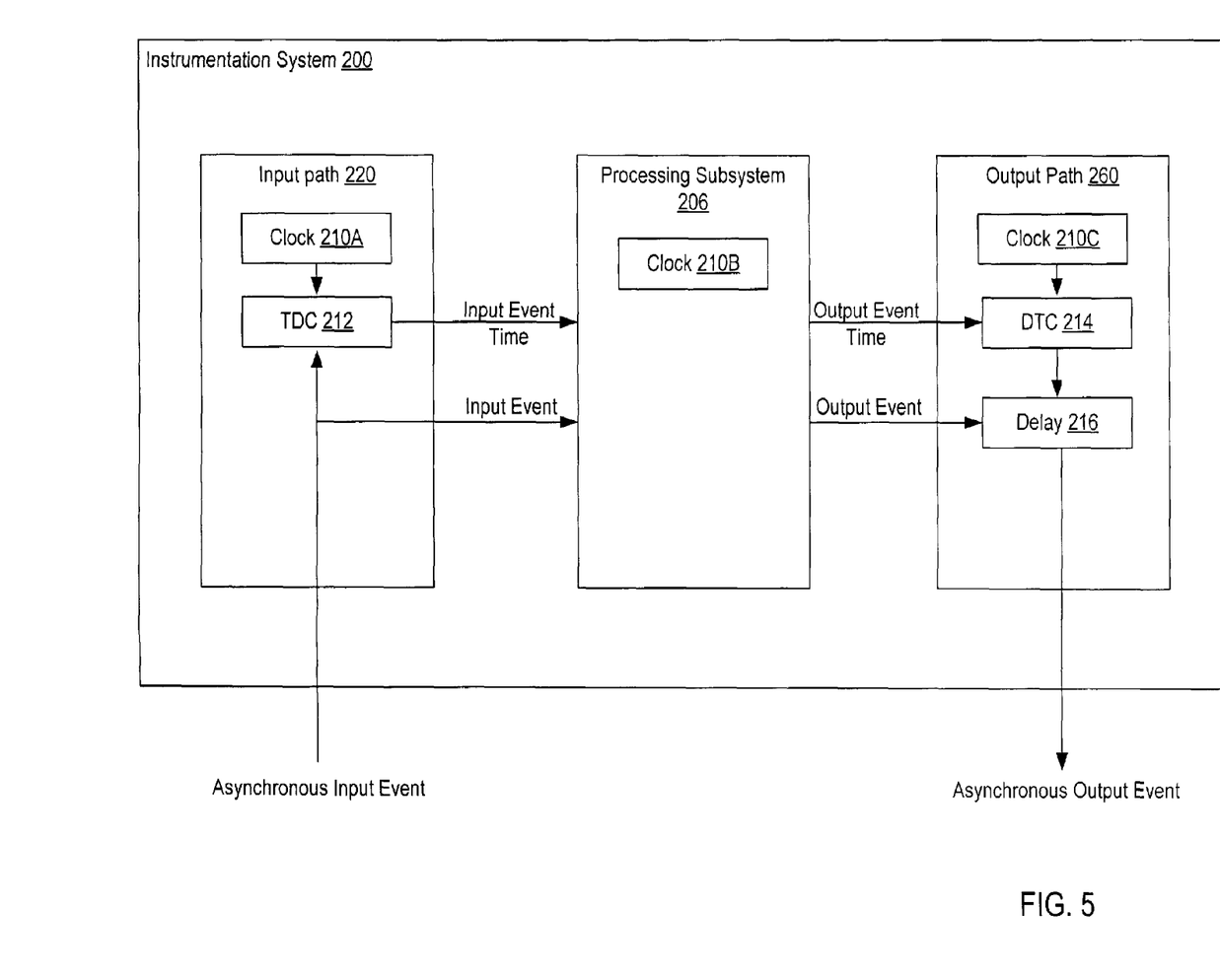
FIG. 5 is a block diagram of one embodiment of a system that is synchronized to a common timeline and configured to handle asynchronous events.

FIG. 5 shows another block diagram of an exemplary system that is configured to handle asynchronous events as described above. The system shown in FIG. 5 may be implemented in one or more of the devices in the instrumentation system 200. In this embodiment, three subsystems are illustrated. Each subsystem includes a local clock 210, and the local clocks 210 of each subsystem are synchronized to a common timeline.

The input path 220 may detect signals (e.g., received from a sensor) indicative of an input event and generate data indicative of the input event (e.g., through A/D conversion). If shared resources are used to generate the data indicative of the input event, the input subsystem may not perform data generation until a timeslot allocated to handling asynchronous events. The input path 220 includes a TDC (Time-to-Digital Converter) 212, which is coupled to receive current time values of the local clock from the local clock 210A. The TDC 212 is also coupled to an input interface of the input subsystem. When an asynchronous input event is detected via the input interface, the TDC 212 generates timestamp data indicative of the input event time relative to the common timeline. Note that while a TDC is used to generate the input event time relative to the common timeline in this embodiment, other embodiments may use other devices to generate the input event time.

The input path 220 may provide data indicative of the input event as well as data indicative of the input event time to the processing subsystem 206. The processing subsystem includes a local clock 210B that is synchronized to the common timeline. The processing subsystem 206 may handle the input event during one or more timeslots allocated to handling asynchronous events. Handling the asynchronous event may involve generating data indicative of one or more responsive output events. This data may depend on the input event time in some embodiments.

The processing subsystem's handling of the asynchronous event may also involve operating on the data indicative of the input event time to generate data indicative of an output event time. This process may also be performed during the timeslots allocated to handling asynchronous events. The output event time may be calculated relative to a system clock pulse. For example, the output event time may be calculated by adding a fixed response time to the input event time. The amount of time to delay performance of the output event relative to the common timeline may be determined by subtracting the input event time and an amount of time equal to the number of periods of the system clock needed to handle the event from the output event time. The remaining time may indicate the amount of time to delay the output event relative to the system clock.

The processing subsystem 206 may provide data indicative of the output event and data indicative of the output event time to an output path 260. The output path 260 may perform the output event (e.g., by providing appropriate electrical signals to an actuator) according to the data indicative of the output event. If generating the output event from the output event data involves access to shared resources, the output path 260 may wait until a timeslot allocated to handling asynchronous events to generate the output event. The output path 260 includes a local clock 210C that is synchronized to the common timeline. The output path 260 may also include a DTC (Digital-to-Time Converter) 214 and a delay unit 216. The delay unit 216 may be configured to delay the output event (e.g., by delaying an electrical signal being provided to an actuator) until the output event time. The DTC 214 may receive the data indicating the output event time as well as values of the local clock 210C. The DTC 214 may responsively signal the arrival of the output event time to the delay unit 216. In response, the delay unit 216 may cease inhibiting output of the output event. Note that in other embodiments, devices other than a DTC may be used to notify the delay unit 216 of the output event time. Furthermore, in some embodiments, the output path 206 may simply wait to generate the output event at the determined output event time, and a separate delay unit 216 may not be used.

Note that in each subsystem 220, if handling the asynchronous event involves accessing shared resources, the asynchronous event handling may be delayed until a timeslot allocated to the process and/or device used to handle the asynchronous event for that particular shared resource. Since access to shared resources occurs within preallocated timeslots, asynchronous event handling does not require interrupting already-scheduled activity within the system. Accordingly, an asynchronous event may be handled within a fixed time period without disrupting the existing timeslot allocation or preempting other scheduled processes' and/or devices' access to shared resources. As a result, the asynchronous event handling may not disrupt the determinism of the other processes being performed within the system. Furthermore, by recording a precise time at which the detection of the input event occurs relative to the common timeline, and by scheduling (or delaying) the output event for an appropriate amount of time relative to the common time line, the event response may take place at a fixed delay from the input without jitter relative to the time at which the input event occurred.

Figure 6:
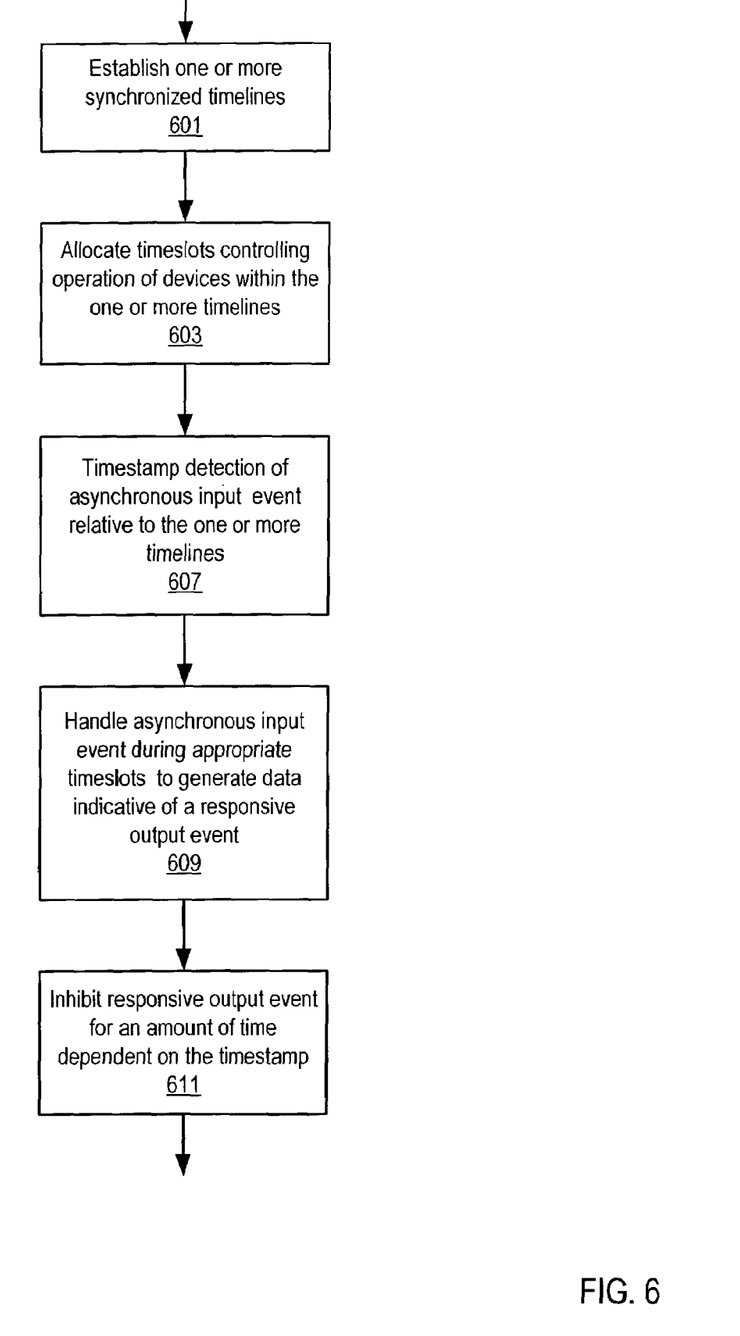
FIG. 6 shows one embodiment of a method of handling an asynchronous event in a time-triggered system.

FIG. 6 is a flowchart showing one embodiment of a method of handling asynchronous events in a time-triggered system. At 601, one or more synchronized timelines are established. Establishing synchronized timelines may involve synchronizing local clocks within one or more distributed devices to a master clock. This may be done using timestamped synchronization messages in some embodiments. Timeslots controlling operation of one or more devices are allocated within the timelines at 603. Timeslots may be allocated to devices or processes that use shared resources. In one embodiment, timeslot allocation may be performed by a compiler. Each device and/or process may be inhibited from using the shared resources during timeslots other than those timeslots allocated to that device or process. Timeslot allocation may involve allocating one or more timeslots to devices and/or processes that handle an asynchronous event, even if such an asynchronous event has not yet been detected.

At 605, an asynchronous input event is detected and the detection is timestamped. In one embodiment, an asynchronous input event may occur if a device being monitored exceeds a predetermined operating threshold. In another embodiment, an asynchronous input event may occur if a device or process under test generates a particular output. Timestamping the detection of an asynchronous input event may involve using a device such as a TDC to generate a time value indicative of the time at which the asynchronous input event is detected relative to a point on the synchronized timelines.

One or more devices and/or processes may operate to generate data indicative of a responsive output event and to generate the responsive output event from the data. If these devices and/or processes use shared resources, they may be inhibited form processing the asynchronous input event until timeslots allocated to those devices and/or processes occur, as shown at 609. Performance of the responsive output event may be delayed by an amount of time determined from the timestamp for the asynchronous input event (e.g., if the responsive output event should occur at a fixed response time after detection of the asynchronous input event). Thus, as shown at 611, the output event may be inhibited for an amount of time dependent on the timestamp generated at 607.

Figure 7A:
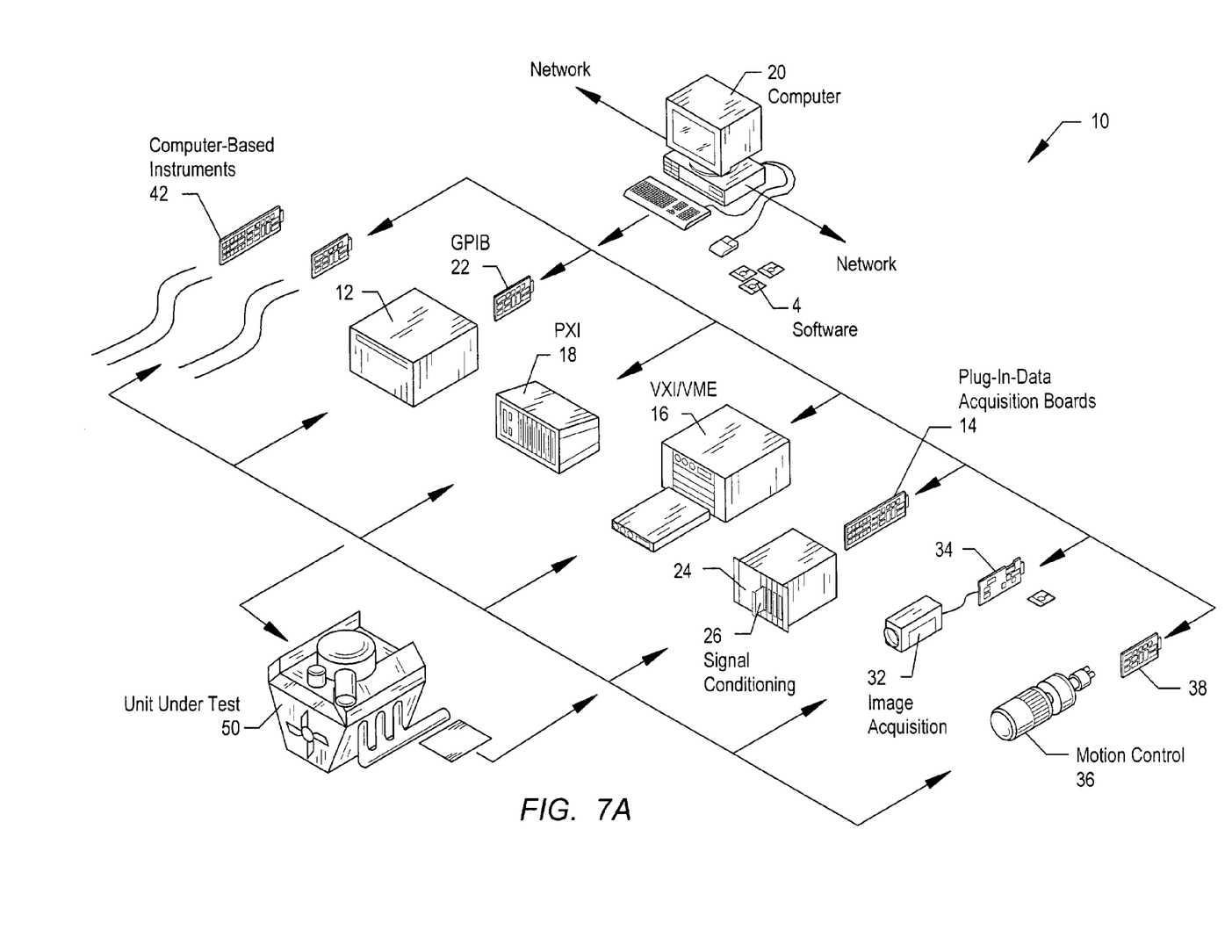
FIGS. 7A–7B show exemplary embodiments of instrumentation systems.
Figure 7B:
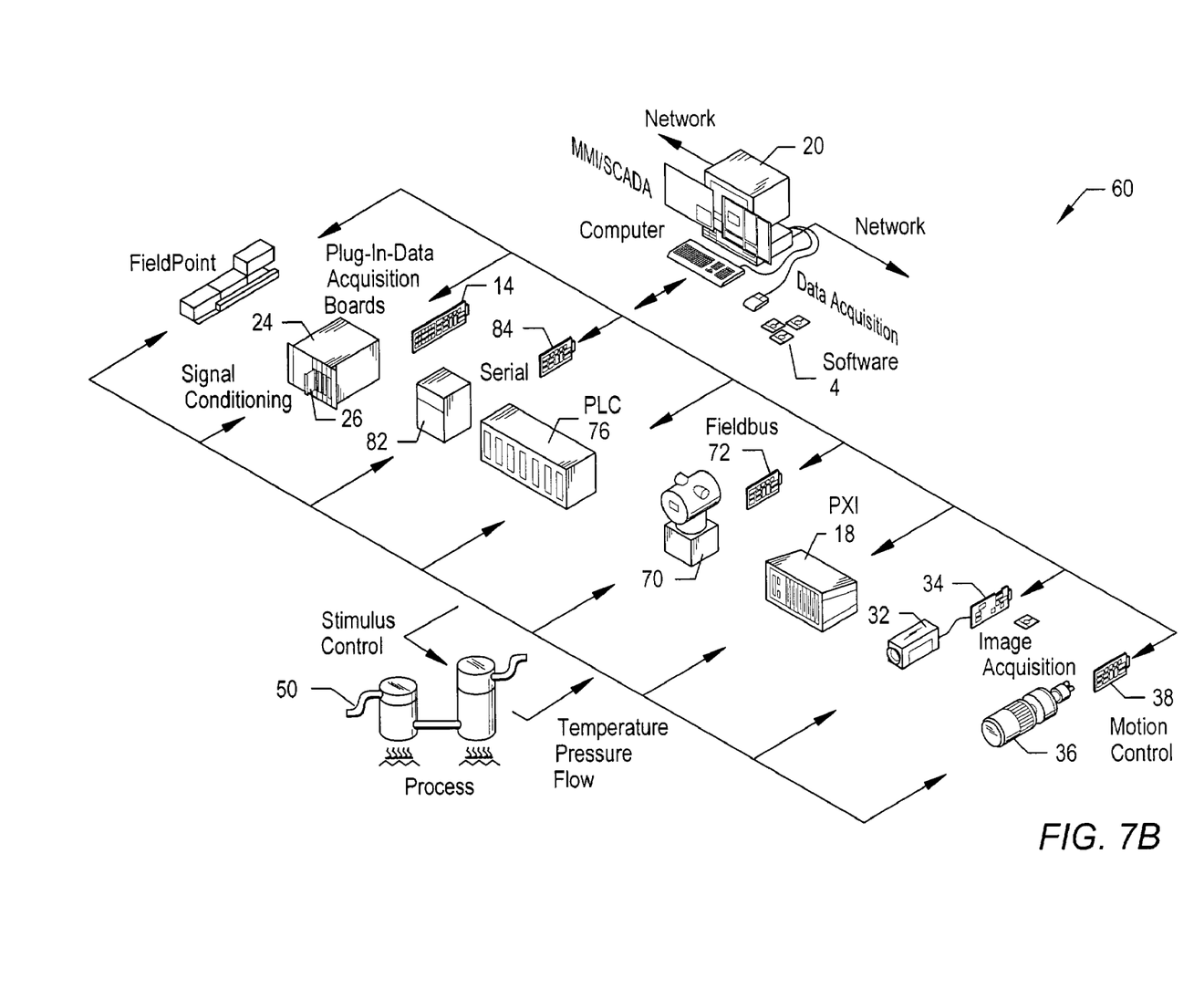

FIGS. 7A and 7B—Instrumentation Systems

FIGS. 7A and 7B illustrate exemplary instrumentation systems. As shown, possible applications of these systems include general data acquisition, including image processing/machine vision, instrumentation, industrial automation, process control, or other purposes. Instrumentation systems such as those shown in FIGS. 7A and 7B may handle asynchronous events as described above.

FIG. 7A illustrates an exemplary instrumentation control system 10. The system 10 may include a host computer 20 that connects to one or more instruments. The host computer 20 may include a CPU, a display screen, memory, and one or more input devices such as a mouse or keyboard as shown. The computer 20 may connect through the one or more instruments to analyze, measure, and/or control a unit under test (UUT) 50 or process under test. The computer 20 may store software 4.

The one or more instruments may include a GPIB (General Purpose Interface Bus) instrument 12 and associated GPIB interface board 22, a data acquisition board 14 and associated signal conditioning circuitry 24, a VXI (VME eXtensions for Instrumentation) instrument 16, a PXI (PCI eXtensions for Instrumentation) instrument 18, a video device 32 and associated image acquisition board 34, a motion control device 36 and associated motion control interface board 38, and/or one or more computer based instrument boards 42, among other types of devices.

The GPIB instrument 12 may be coupled to the computer 20 via the GPIB interface board 22 provided by the computer 20. In a similar manner, the video device 32 may be coupled to the computer 20 via the image acquisition board 34, and the motion control device 36 may be coupled to the computer 20 through the motion control interface board 38. The data acquisition board 14 may be coupled to the computer 20, and may interface through signal conditioning circuitry 24 to the UUT 50. The signal conditioning circuitry 24 may include an SCXI (Signal Conditioning eXtensions for Instrumentation) chassis that contains one or more SCXI modules 26.

The GPIB board 22, the image acquisition board 34, the motion control interface board 38, and the DAQ (Data AcQuisition) board 14 may be plugged into an I/O slot in the computer 20, such as a PCI (Peripheral Component Interconnect) bus slot, a PC (Personal Computer) Board slot, or an ISA (Industry Standard Architecture), EISA (Extended ISA), or MicroChannel bus slot provided by the computer 20. However, these boards 22, 34, 38 and 14 are shown external to computer 20 for illustrative purposes.

The VXI chassis or instrument 16 may be coupled to the computer 20 via a VXI bus, MXI bus, or other serial or parallel bus provided by the computer 20. The computer 20 may include VXI interface logic, such as a VXI, MXI, or GPIB interface board (not shown) that interfaces to the VXI chassis 16. The PXI chassis or instrument may be coupled to the computer 20 through the computer's PCI bus.

A serial instrument (not shown) may also be coupled to the computer 20 through a serial port, such as an RS-232 port, USB (Universal Serial Bus) or IEEE 1394 or 1394.2 bus provided by the computer 20. In typical instrumentation control systems, an instrument of each interface type will not be present, and many systems may only have one or more instruments of a single interface type, such as only GPIB instruments.

The instruments may be coupled through one or more sensors or transducers to the UUT 50 or process under test. The system 10 may be used in a data acquisition and control application, in a test and measurement application, a process control application, a man-machine interface application, a hardware-in-the-loop application, or a simulation application, among others.

FIG. 7B illustrates an exemplary industrial automation system 60. The industrial automation system 60 is similar to the instrumentation or test and measurement system 10 shown in FIG. 7A. For convenience, elements which are similar or identical to elements in FIG. 7A have the same reference numerals. The system 60 includes a computer 20 that couples to one or more devices or instruments. The computer 20 may include a CPU, a display screen, memory, and one or more input devices such as a mouse or keyboard as shown. The computer 20 may connect through the one or more devices to a process 50 or device to perform an automation function, such as MMI (Man Machine Interface), SCADA (Supervisory Control and Data Acquisition), portable or distributed data acquisition, process control, advanced analysis, or other control.

The one or more devices may include a data acquisition board 14 and associated signal conditioning circuitry 24, a PXI instrument 18, a video device 32 and associated image acquisition board 34, a motion control device 36 and associated motion control interface board 38, a fieldbus device 70 and associated fieldbus interface board 72, a PLC (Programmable Logic Controller) 76, a serial instrument 82 and associated serial interface board 84, or a distributed data acquisition system, such as the Fieldpoint system available from National Instruments, among other types of devices.

The DAQ board 14, the PXI chassis 18, the video device 32, and the image acquisition board 34 may be connected to the computer 20 as described above. The serial instrument 82 may be coupled to the computer 20 through a serial interface board 84, or through a serial port, such as an RS-232 port, provided by the computer 20. The PLC 76 may couple to the computer 20 through a serial port, Ethernet port, or a proprietary interface. The fieldbus interface board 72 may be included in the computer 20 and may interface through a fieldbus network to one or more fieldbus devices. Each of the DAQ board 14, the serial board 84, the fieldbus board 72, the image acquisition board 34, and the motion control board 38 are typically plugged in to an I/O slot in the computer 20 as described above. However, these boards 14, 84, 72, 34, and 38 are shown external to computer 20 for illustrative purposes. In typical industrial automation systems, a device will not be present of each interface type, and many systems may only have one or more devices of a single interface type, such as only PLCs. The devices are coupled to the device or process 50.

Figure 8A:
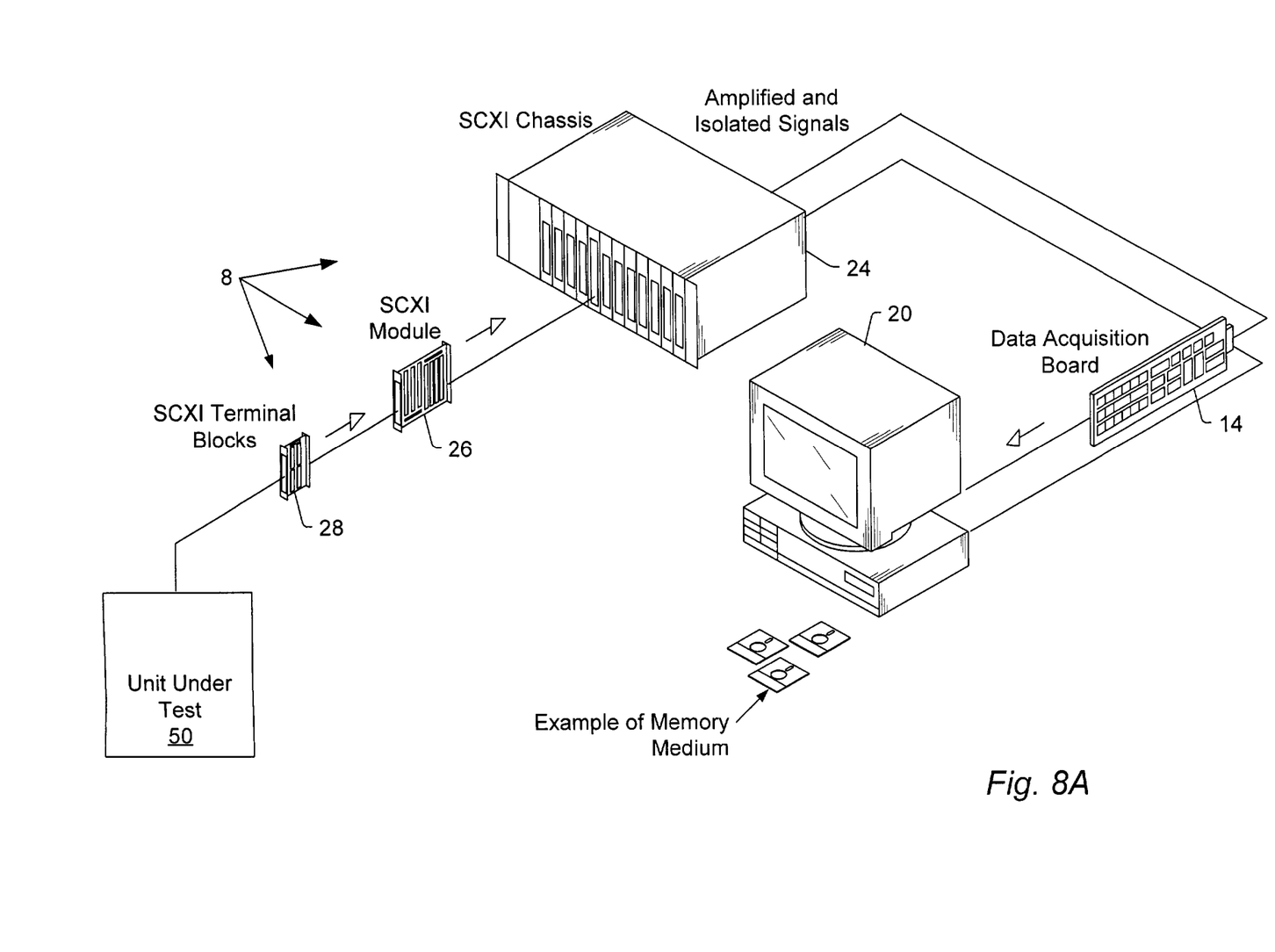
FIGS. 8A–8B show exemplary embodiments of data acquisition and/or measurement systems.
Figure 8B:
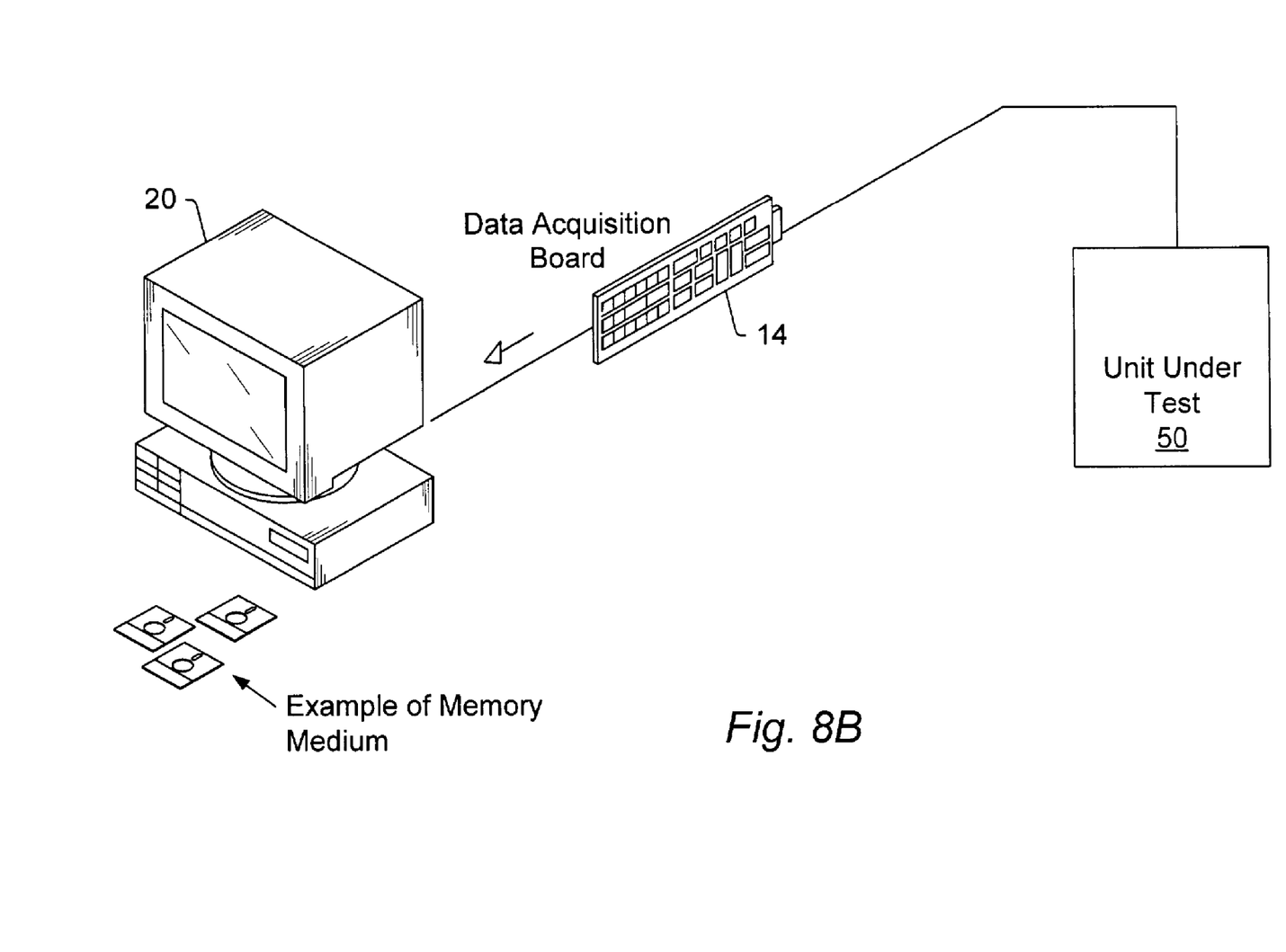

FIGS. 8A and 8B—Data Acquisition and/or Measurement Systems

FIGS. 8A and 8B illustrate exemplary data acquisition and/or measurement systems that may handle asynchronous events as described above. FIG. 8A illustrates a system that includes computer system 20, data acquisition device or board 14, and a signal conditioning system 8. The system may be coupled to measure a unit under test 50. The system may couple to the UUT 50 through a sensor or transducer (not shown). As shown, the signal conditioning system 8 may include a signal conditioning chassis, e.g., an SCXI chassis 24, an SCXI module 26 and one or more SCXI terminal blocks 28.

FIG. 8B illustrates a system that includes computer system 20 and data acquisition device or board 14. In this embodiment, the system does not include a signal conditioning system 8. The data acquisition device or board 14 may couple through a sensor or transducer to a UUT or process under test 50.

It is noted that although the data acquisition device is shown in FIGS. 7A–8B as being implemented on a board or board, the DAQ device may be implemented in other ways (e.g., on a VXI board installed in a VXI chassis or a PXI board installed in a PXI chassis).

Figure 9:
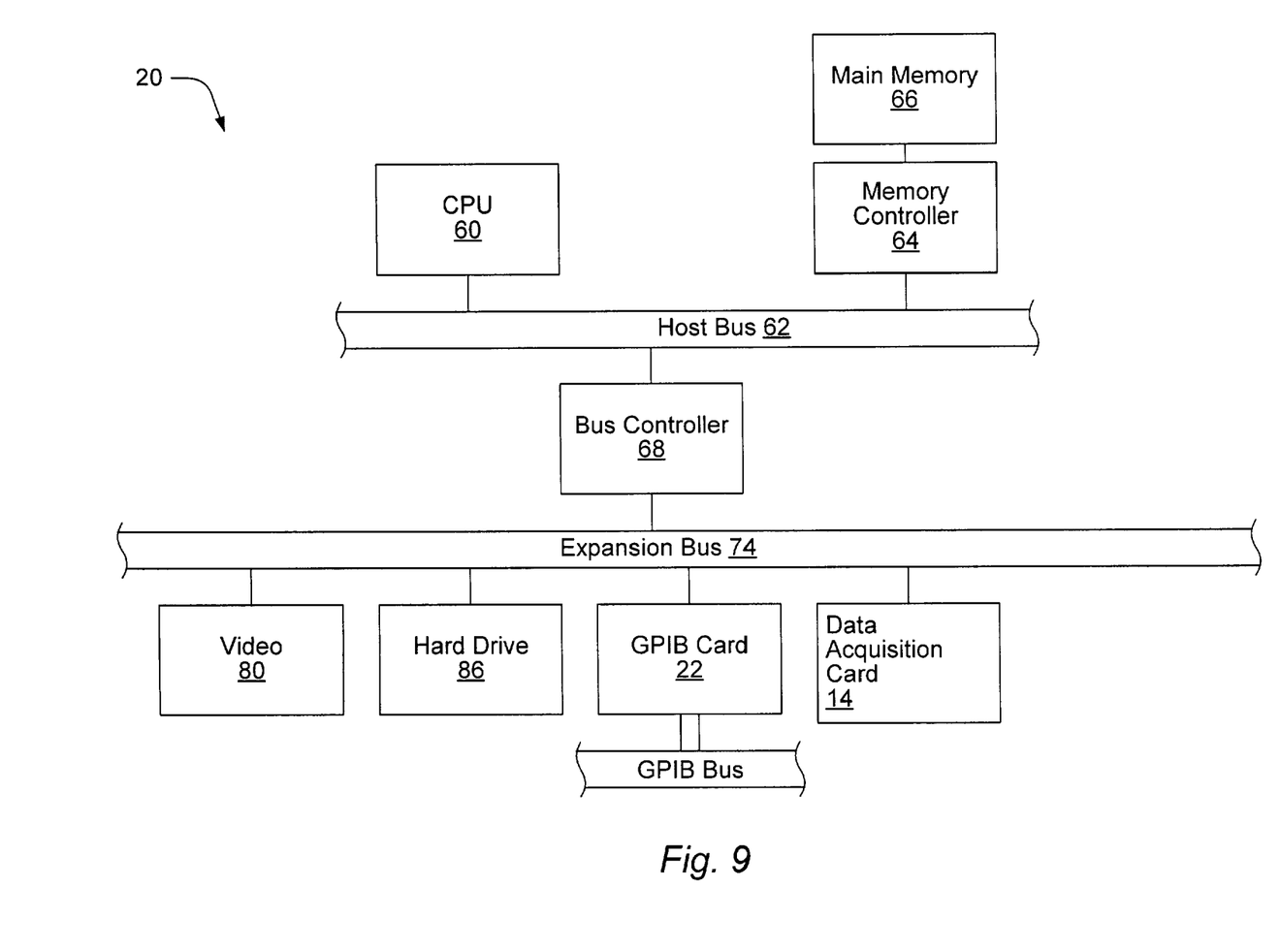
FIG. 9 shows an exemplary embodiment of a computer system.

FIG. 9—Computer System

FIG. 9 is a block diagram of an exemplary computer system 20, e.g., the computer system 20 in FIGS. 7A–8B or the computer system 20A and/or 20B in FIG. 1. It is noted that any type of computer system configuration or architecture may be used, and FIG. 9 illustrates a representative PC embodiment. It is also noted that the computer system may be a general purpose computer system as shown in FIGS. 7A–8B, a computer implemented on a VXI board installed in a VXI chassis, a computer implemented on a PXI board installed in a PXI chassis, or other types of embodiments. For simplicity, the elements of a computer not necessary to understand the present invention have been omitted.

The computer 20 includes at least one processor or central processing unit or CPU 60 that is coupled to a processor or host bus 62. The CPU 60 may be any of various types, including an x86 processor, e.g., a Pentium™ class, a PowerPC™ processor, a CPU from the SPARC™ family of RISC processors, as well as others. Main memory 66 is coupled to the host bus 62 by means of memory controller 64.

The main memory 66 may store software according to one embodiment of the present invention for configuring instrumentation boards that send and receive triggers in response to one or more internally generated trigger enable signals. The main memory 66 also stores operating system software as well as the software for operation of the computer system, as well known to those skilled in the art. In one embodiment, the main memory 66 may store software for allocating timeslots to control access to shared resources.

The host bus 62 is coupled to an expansion or input/output bus 74 by means of a bus controller 68 or bus bridge logic. The expansion bus 74 is preferably the PCI expansion bus, although other bus types can be used. The expansion bus 74 includes slots for various devices such as the data acquisition board 14 and/or a GPIB board 22. The computer 20 may further include a video display subsystem 80 and hard drive 86 coupled to the expansion bus 70.

Generally, a computer system 20 may take various forms. As used herein, the term "computer system" is intended to encompass any of various devices that include a processor that can execute instructions from a memory medium and/or may include a programmable logic device that can be configured to execute a method or algorithm. Exemplary computer systems 20 may include a personal computer system, mainframe computer system, workstation, network appliance, Internet appliance, personal digital assistant (PDA), television system, embedded device, intelligent instrument, smart sensor, and other systems.

Numerous variations and modifications will become apparent to those skilled in the art once the above disclosure is fully appreciated. It is intended that the following claims be interpreted to embrace all such variations and modifications.

What is claimed is:

1. A method for operating a system comprising a plurality of subsystems, the method comprising:
   establishing one or more timelines for the system, wherein the one or more timelines are synchronized to each other;
   allocating timeslots within each of the one or more timelines for operation of one or more devices in the system;
   detecting an input event, wherein said detecting occurs asynchronously to the one or more timelines;
   generating a timestamp indicative of an input event detection time of said detecting relative to the timeline;
   performing a processing task in response said detecting, wherein said performing occurs during a time slot of the one or more timelines, wherein the time slot is allocated to the processing task, wherein said performing the processing task generates data indicative of an output event; and
   inhibiting generation of the output event until a second time relative to the one or more timelines, wherein the second time is dependent on the timestamp; and
   generating the output event at the second time.

2. The method of claim 1, wherein the second time occurs a pre-determined time interval after the input event detection time.

3. The method of claim 1, wherein said inhibiting generation of the output event comprises inhibiting generation of the output event until a pre-determined time interval has elapsed after the input event detection time.

4. The method of claim 1, wherein said establishing comprises periodically distributing timestamped synchronization messages to the plurality of subsystems.

5. The method of claim 1, wherein said performing a processing task comprises generating data indicative of the second time by operating on the timestamp indicative of the input event detection time.

6. The method of claim 1, wherein said inhibiting comprises providing data indicative of the second time to a digital-to-time converter.

7. A system comprising a plurality of subsystems, wherein one or more timelines are established for the system, wherein the one or more timelines are synchronized to each other, wherein each of the one or more timelines includes one or more timeslots allocated to control operation of one or more devices, the system comprising:
   a first device configured to detect an input event that occurs asynchronously to the one or more timelines and to generate a timestamp indicative of an event arrival time of the input event relative to the one or more timelines;
   a second device coupled to the first device and comprising a functional unit configured to perform a processing task in response to detection of the input event, wherein the functional unit is configured to perform the processing task during one or more timeslots of the one or more timelines, wherein the one or more timeslots are allocated to the processing task, and wherein the processing task generates data indicative of an output event;
   wherein the second device is configured to inhibit generation of the output event until a second time relative to the one or more timelines, wherein the second time is dependent on the timestamp.

8. The system of claim 7, wherein the second time occurs a pre-determined time interval after the event detection arrival time.

9. The system of claim 7, wherein the second device is configured to inhibit generation of the output event until a predetermined time interval has elapsed after the event arrival time.

10. The system of claim 7, wherein as part of performing the processing task, the functional unit is configured to generate data indicative of the second time by operating on the timestamp indicative of the event arrival time.

11. A system comprising:
   a plurality of subsystems configured to be synchronized to a system clock;
   an input path included in one of the plurality of subsystems, wherein the input path is configured to detect an input event and to generate a timestamp indicating a first time at which the input event is detected relative to a system clock value, wherein the input event is detected asynchronously to the system clock;
   a functional unit included in one of the plurality of subsystems, wherein the functional unit is configured to perform a process in response to detection of the input event, wherein the functional unit is configured to inhibit performing the process until a first timeslot, wherein the first timeslot is allocated to performance of the process by the functional unit;
   an output path coupled to the functional unit and configured to inhibit an output event generated by performing the process until a second time, wherein the second time is dependent on the timestamp.

* * * * *